(12) United States Patent
Teng et al.

(10) Patent No.: US 10,651,940 B1
(45) Date of Patent: May 12, 2020

(54) CMOS SINGLE-TUBE INFRARED TRANSCEIVER

(71) Applicant: Beken Corporation, Shanghai (CN)

(72) Inventors: Long Teng, Shanghai (CN); Jiazhou Liu, Shanghai (CN); Jian Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 0 days.

(21) Appl. No.: 16/539,668

(22) Filed: Aug. 13, 2019

(30) Foreign Application Priority Data

Jul. 9, 2019 (CN) .......................... 2019 1 0616760

(51) Int. Cl.
*H04B 10/00* (2013.01)
*H04B 10/40* (2013.01)
*H04B 1/44* (2006.01)

(52) U.S. Cl.
CPC ............. *H04B 10/40* (2013.01); *H04B 1/44* (2013.01)

(58) Field of Classification Search
USPC .................................................. 398/135–139
See application file for complete search history.

(56) References Cited

U.S. PATENT DOCUMENTS

| | | | | |
|---|---|---|---|---|
| 5,349,595 A * | 9/1994 | Ogawa | ................... | H01S 5/042 372/38.02 |
| 5,617,236 A * | 4/1997 | Wang | ................... | G06F 13/385 375/214 |
| 6,021,143 A * | 2/2000 | Ransijn | ................... | H01S 5/042 372/38.02 |
| 6,466,041 B1 * | 10/2002 | Egerer | ................... | H04B 10/11 324/239 |
| 6,826,215 B2 * | 11/2004 | Tsuji | ................... | H01S 5/042 372/29.015 |
| 7,075,338 B2 * | 7/2006 | Mizuno | ................... | H01S 5/042 327/53 |
| 8,305,122 B2 * | 11/2012 | Sakaguchi | ....... | H03K 17/04123 327/170 |
| 8,344,654 B2 * | 1/2013 | Horiuchi | ................. | H01S 5/042 315/224 |
| 2003/0006746 A1 * | 1/2003 | Nishimura | .............. | G05F 3/262 323/313 |
| 2006/0221678 A1 * | 10/2006 | Bedeschi | ............. | G11C 11/5678 365/163 |
| 2009/0034650 A1 * | 2/2009 | Norimatsu | ........... | H04B 1/7174 375/295 |
| 2009/0167205 A1 * | 7/2009 | Petersen | .............. | A61B 5/0205 315/291 |
| 2009/0189647 A1 * | 7/2009 | Easwaran | ............... | G05F 3/262 327/77 |
| 2010/0019693 A1 * | 1/2010 | Hoogzaad | .............. | H05B 45/37 315/294 |

(Continued)

*Primary Examiner* — Agustin Bello
(74) *Attorney, Agent, or Firm* — Schwegman Lundberg & Woessner, P.A.

(57) ABSTRACT

A CMOS IR transceiver includes an IR transmitter circuit, an IR receiver circuit, and an IR diode configured to either emit or receive an IR signal. CMOS elements, such as a PMOS current mirror, a PMOS switch, a NMOS switch, a NMOS current mirror, and a receiver enabling PMOSFET switch are used in the CMOS IR transceiver. The CMOS IR transceiver may have advantages of increased integration, occupying less space, and lower cost.

19 Claims, 3 Drawing Sheets

(56) References Cited

U.S. PATENT DOCUMENTS

| | | | |
|---|---|---|---|
| 2011/0050967 A1* | 3/2011 | Matsumoto | H03M 1/745 348/294 |
| 2011/0156690 A1* | 6/2011 | Fujiyama | G05F 3/30 323/313 |
| 2011/0193924 A1* | 8/2011 | Nagumo | B41J 2/45 347/118 |
| 2012/0275290 A1* | 11/2012 | Dean | G11B 7/1263 369/122 |
| 2013/0121357 A1* | 5/2013 | Warren | G11B 7/00456 372/38.02 |
| 2013/0256508 A1* | 10/2013 | Jahana | G01J 1/44 250/206 |
| 2014/0002887 A1* | 1/2014 | Yeung | G02B 26/00 359/291 |
| 2017/0019577 A1* | 1/2017 | Tan | H04N 5/33 |
| 2020/0077039 A1* | 3/2020 | Zimmerman | H04N 5/3698 |

* cited by examiner

US 10,651,940 B1

CMOS SINGLE-TUBE INFRARED TRANSCEIVER

CROSS REFERENCE TO RELATED APPLICATION

This application claims priority to Chinese Application Number 201910616760.8 filed Jul. 9, 2019, entitled "CMOS SINGLE-TUBE INFRARED TRANSCEIVER," which is incorporated herein by reference in its entirety.

TECHNICAL FIELD

The present application relates to an infrared transceiver, particularly to a single-tube infrared transceiver.

BACKGROUND

Infrared (IR) transceivers are widely used in IR communications, for example, in remote controllers of household electronic devices (like televisions, air-conditioners, and VCD devices, etc.). Conventionally, an IR transceiver may occupy large space and have high cost. Therefore, a new IR transceiver occupying less space and having lower cost becomes highly desirable.

SUMMARY

According to an embodiment, a CMOS single-tube IR transceiver may comprise an IR transmitter circuit, an IR diode, and an IR receiver circuit.

In an embodiment, a CMOS infrared (IR) transceiver comprises an IR transmitter circuit, an IR receiver circuit and an IR diode coupled to the IR transmitter circuit and the IR receiver circuit configured to emit an output IR signal or accept an input IR signal. The transmitter circuit comprises: a PMOS current mirror having a first PMOSFET and a second PMOSFET, a NMOS current mirror having a first NMOSFET and a second NMOSFET, a PMOS switch, and a NMOS switch coupled in series with the PMOS switch. The PMOS current mirror and the NMOS current mirror is coupled in series between a power supply and the PMOS switch, wherein the NMOS current mirror is coupled in series between the PMOS switch and the ground, and the NMOS switch is coupled in parallel with the first NMOSFET, and wherein the PMOS switch and the NMOS switch are configured to receive a Pulse Width Modulated (PWM) signal from a Micro Controller Unit (MCU).

In an embodiment, a method comprises receiving a receiver enabling signal using a CMOS single-tube IR transceiver, closing an IR receiver circuit; receiving the PWM signal using an IR transmitter circuit; and emitting a modulated IR signal by an IR diode.

The CMOS single-tube IR transceiver includes an IR transmitter circuit, the IR transmitter circuit comprising: a PMOS current mirror having a first PMOSFET and a second PMOSFET, a NMOS current mirror having a first NMOSFET and a second NMOSFET, a PMOS switch, and a NMOS switch, wherein the PMOS current mirror is coupled in series between a power supply and the PMOS switch, wherein the NMOS current mirror is coupled in series between the PMOS switch and the ground, wherein the NMOS switch is coupled in parallel with the first NMOSFET, and wherein the PMOS switch and the NMOS switch are configured to receive a Pulse Width Modulated signal from a Micro Controller Unit; an IR receiver circuit comprising a receiver enabling PMOSFET switch; and an IR diode coupled to the IR transmitter circuit and the IR receiver circuit and configured to emit or receive an IR signal.

In an embodiment, a method of receiving an infrared signal comprises: receiving a receiver enabling signal using a CMOS single-tube IR transceiver, closing an IR transmitter circuit; receiving a modulated IR signal by an IR diode to create a current signal; converting the current signal by the current detector into a voltage signal; amplifying the voltage signal by a scale amplifier; and outputting the voltage signal to a Micro Controller Unit (MCU).

The CMOS single-tube IR transceiver includes an IR transmitter circuit configured to drive an emission of an IR signal; an IR receiver circuit comprising a receiver enabling PMOSFET switch, a current detector, a scale amplifier, and a comparator coupled in series; and an IR diode coupled to the IR transmitter circuit and the IR receiver circuit and configured to emit or receive an IR signal.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

DETAILED DESCRIPTION OF THE ILLUSTRATED EMBODIMENTS

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, so as concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section.

Without loss of generality, reference will be made to illustrative embodiments by taking a CMOS single-tube IR transceiver, a method of transmitting a modulated IR signal using the CMOS single-tube IR transceiver, and a method of receiving a modulated IR signal using the CMOS single-tube IR transceiver as examples. Those of ordinary skills in the art understand that this is only to describe the application clearly and adequately, rather than limit the scope of the application, which is defined by the appended claims.

Typically, an IR transceiver may use two IR diodes, one IR diode to emit an IR signal, and the other IR diode to receive an IR signal. An IR transceiver also may merely use a single IR tube used to either emit or receive an IR signal. However, an IR transceiver merely using a single IR tube typically may occupy large space in a Printed Circuit Board (PCB), may be hard to integrate with a Micro Controller Unit (MCU), and thus may cause high cost.

Figure 1:
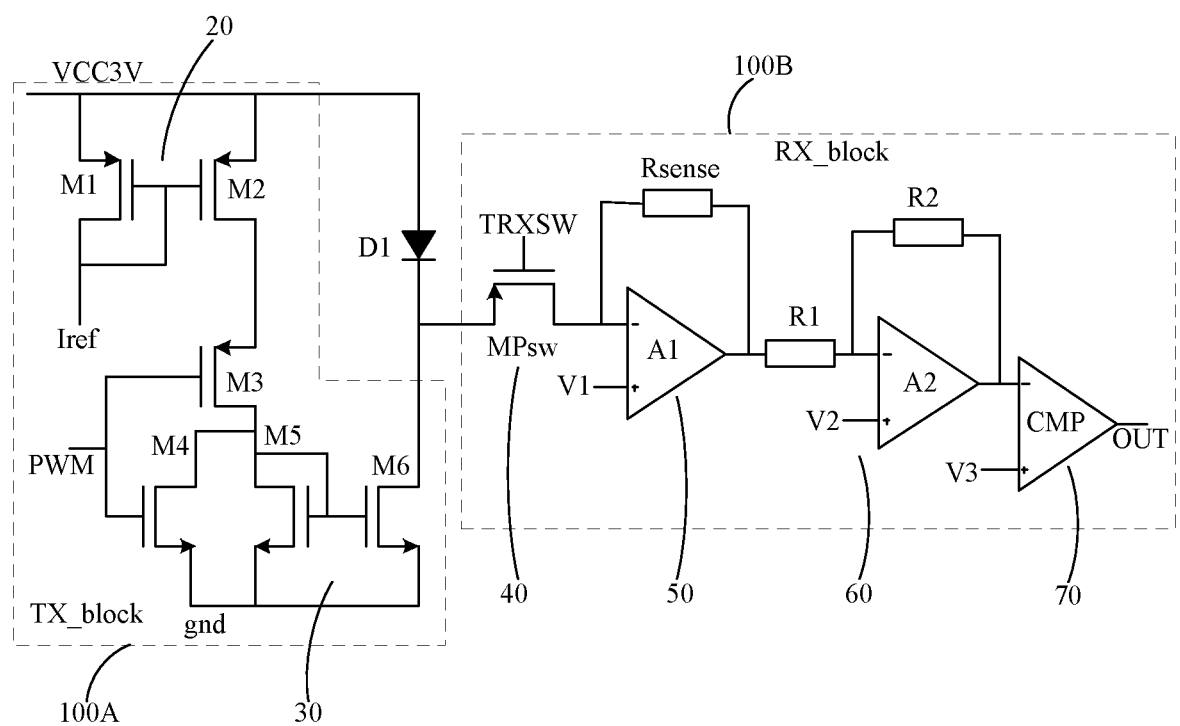
FIG. 1 is a block diagram illustrating a CMOS single-tube IR transceiver according to an embodiment of the application.

FIG. 1 shows a CMOS single-tube IR transceiver 100 according to an embodiment of the application. The CMOS single-tube IR transceiver 100 may comprise an IR transmitter circuit (TX_block) 100A, an IR receiver circuit (RX_block) 100B, and an IR diode D1 coupled to the IR transmitter circuit 100A and the IR receiver circuit 100B. The IR diode D1 may be placed outside the IR transmitter circuit 100A and the IR receiver circuit 100B, and may be configured to either emit or receive an input IR signal under control. The structure and the components of the CMOS single-tube IR transceiver 100 will be explained in more detail below.

In an embodiment, the IR transmitter circuit 100A may comprise a PMOS current mirror 20 having a first PMOSFET M1 and a second PMOSFET M2, a NMOS current mirror 30 having a first NMOSFET M5 and a second NMOSFET M6, a PMOS switch M3, and a NMOS switch M4.

The PMOS current mirror 20 is coupled in series between a power supply Vcc (e.g., 3V) and the PMOS switch M3. The NMOS current mirror 30 is coupled in series between the PMOS switch M3 and the ground (gnd). The NMOS switch M4 is coupled in series between the PMOS switch M3 and the ground. The NMOS switch M4 is coupled in parallel with the first NMOSFET M5.

Sources of the first PMOSFET M1 and the second PMOSFET M2 are coupled to the power supply Vcc. Gates of the first PMOSFET M1 and the second PMOSFET M2, and a drain of the first PMOSFET M1 are coupled together and configured to receive a reference current Iref, which is provided from a Micro Controller Unit (MCU) (not shown in FIG. 1).

A source of the PMOS switch M3 is coupled to a drain of the second PMOSFET M2. Drains of the PMOS switch M3, the NMOS switch M4 and the first NMOSFET M5 are coupled to gates of the first NMOSFET M5 and the second NMOSFET M6. Sources of the NMOS switch M4, the first NMOSFET M5 and the second NMOSFET M6 are coupled together to the ground.

Gates of the PMOS switch M3 and the NMOS switch M4 are coupled together and configured to receive a 38 KHz modulated Pulse Width Modulated (PWM) signal, which is provided from the MCU (not shown in FIG. 1) and configured to drive the IR diode D1 to emit an IR signal.

The IR diode D1 may be coupled in series between the power supply Vcc and the second NMOSFET M6 of the NMOS current mirror 30. The anode (+) of the IR diode D1 may be coupled to the power supply Vcc, and the cathode (−) of the IR diode D1 may be coupled to a drain of the second NMOSFET M6 of the NMOS current mirror 30. While the CMOS single-tube IR transceiver 100 is working in a transmitting mode, the IR diode D1 may emit an IR signal.

In an embodiment, the IR receiver circuit 100B may comprise a receiver enabling PMOSFET switch (MPsw) 40, a current detector 50, a scale amplifier 60, and a comparator 70, which are coupled in series. A source of the receiver enabling PMOSFET switch 40 may be coupled to the cathode (−) of the IR diode D1.

While the CMOS single-tube IR transceiver 100 is working in a receiving mode, the IR diode D1 may receive an IR signal. The receiver enabling PMOSFET switch 40 may be used to play a role to control whether the IR transmitter circuit 100A or the IR receiver circuit 100B is set ready to work as explained below using examples.

As one example, upon a gate of the receiver enabling PMOSFET switch 40 receiving a receiver enabling signal (TRXSW) at a high-voltage level, the IR receiver circuit 100B will be closed (or shut down) and the IR transmitter circuit 100A will be set ready to work, and thus the IR diode D1 may emit an IR signal.

As another example, upon the gate of the receiver enabling PMOSFET switch 40 receiving a receiver enabling signal (TRXSW) at a low-voltage level and the PWM signal received by the IR transmitter circuit 100A from the MCU being at a low-voltage level, the IR transmitter circuit 100A will be closed (or shut down) and the IR receiver circuit 100B will be set ready to work. Thus, the IR diode D1 will receive an IR signal, and a tiny reverse current (at µA level) will occur and flow through the receiver enabling PMOSFET switch 40 into the IR receiver circuit 100B.

In an embodiment, the current detector 50 may comprise a current detection resistor (Rsense) and a first amplifier A1 coupled in parallel. The current detector 50 may detect the tiny reverse current, and may convert the tiny reverse current into a voltage signal.

In an embodiment, the scale amplifier 60 may comprise a first resistor R1 and a second resistor R2 coupled in series, and a second amplifier A2 coupled in parallel with the second resistor R2. The scale amplifier 60 may amplify the voltage signal received from the current detector 50.

In an embodiment, the comparator 70 may shape the amplified voltage signal from the scale amplifier 60, and may output the shaped voltage signal to the MCU (not shown in FIG. 1). The MCU may demodulate the shaped voltage signal to obtain a demodulated signal.

Voltages such as V1, V2 and V3 as shown in the IR receiver circuit 100B of FIG. 1 are bios voltages of 2.4 V (3-0.6 V) for example.

In an embodiment, the PWM signal received by the IR transmitter circuit 100A and the receiver enabling signal (TRXSW) received by the IR receiver circuit 100B may control in what mode (either the IR transmitting mode or the IR receiving mode) the CMOS single-tube IR transceiver 100 is set ready to work as explained below using examples.

A). The transmitting mode is taken when the receiver enabling signal (TRXSW) received by the IR receiver circuit 100B is at high-voltage level.

A signal PWM generated by the MCU and received by the IR transmitter circuit 100A is used to control the PMOS switch M3 and the NMOS switch M4. When the PWM signal received at gates of the PMOS switch M3 and the NMOS switch M4 is at a high-voltage level, the PMOS switch M3 will be turned off and the NMOS switch M4 will be turned on, no current will flow through the first NMOSFET M5 and the second NMOSFET M6, no current will flow through the IR diode D1, and thus no IR signal will be emitted by the IR diode D1.

Otherwise, when the PWM signal received at gates of the PMOS switch M3 and the NMOS switch M4 is at a low-voltage level, the PMOS switch M3 will be turned on and the NMOS switch M4 will be turned off, a current will flow through the first NMOSFET M5 and the second NMOSFET M6, a current will flow through the IR diode D1, and thus the IR diode D1 as an IR emitter will emit an IR signal.

In an embodiment, the current strength flowing through the IR diode D1 is determined by a ratio of the size of the first PMOSFET M1 to the size of the second PMOSFET M2 and a ratio of the size of the first NMOSFET M5 to the size of the second NMOSFET M6.

B). The receiving mode is taken when the receiver enabling signal (TRXSW) received by the IR receiver circuit 100B is at low-voltage level.

To set the IR receiver circuit 100B ready to work, the receiver enabling signal (TRXSW) in the IR receiver circuit 100B needs to be set at a low-voltage level to turn on the IR receiver circuit 100B, and the PWM signal received in the IR transmitter circuit 100A needs to be at a high-voltage level so as to turn off the second NMOSFET M6 (thus to turn off the IR transmitter circuit 100A).

In the receiving mode, when the IR diode D1 (as an IR receiver) is irradiated by a strong IR light, the IR diode D1 will produce a reverse-current signal, which is proportional to the intensity of the IR light, and will flowing from the cathode of the IR diode D1 to the anode of the IR diode D1.

The current signal caused by the IR diode D1 flows through the receiver enabling PMOSFET switch 40 into the current detector 50. The current detector 50 transforms the current signal into a voltage signal and outputs the voltage signal to the scale amplifier 60. The scale amplifier 60 amplifies the voltage signal and outputs the amplified voltage signal to the comparator 70. The comparator 70 shapes the amplified voltage signal from the scale amplifier 60, and outputs the shaped voltage signal to the MCU (not shown in FIG. 1). The MCU may demodulate the received voltage signal to obtain a demodulated signal.

Figure 2:
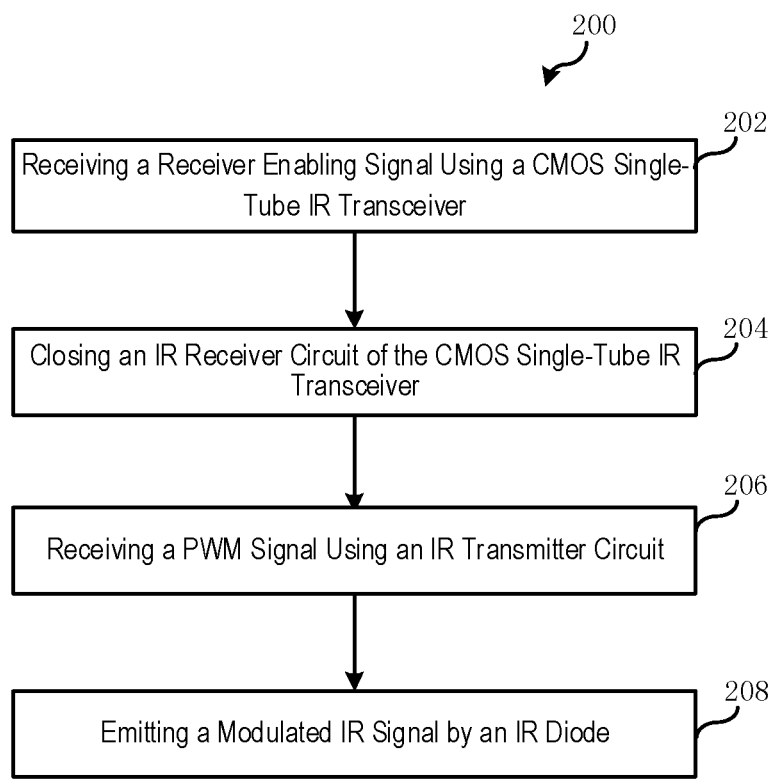
FIG. 2 is a flow chart illustrating a method of transmitting a modulated IR signal using the CMOS single-tube IR transceiver according to an embodiment of the application.

FIG. 2 is a flow chart illustrating a method 200 of transmitting a modulated IR signal using a CMOS single-tube IR transceiver 100 according to an embodiment. In an embodiment, in step 202, receiving a receiver enabling signal (TRSXW) using the CMOS single-tube IR transceiver 100 as shown in FIG. 1, in step 204, closing the IR receiver circuit 100B of the CMOS single-tube IR transceiver 100, in step 206, receiving the PWM signal using the IR transmitter circuit 100A from the MCU, and in step 208, emitting a modulated IR signal by the IR diode D1 as discussed above.

Figure 3:
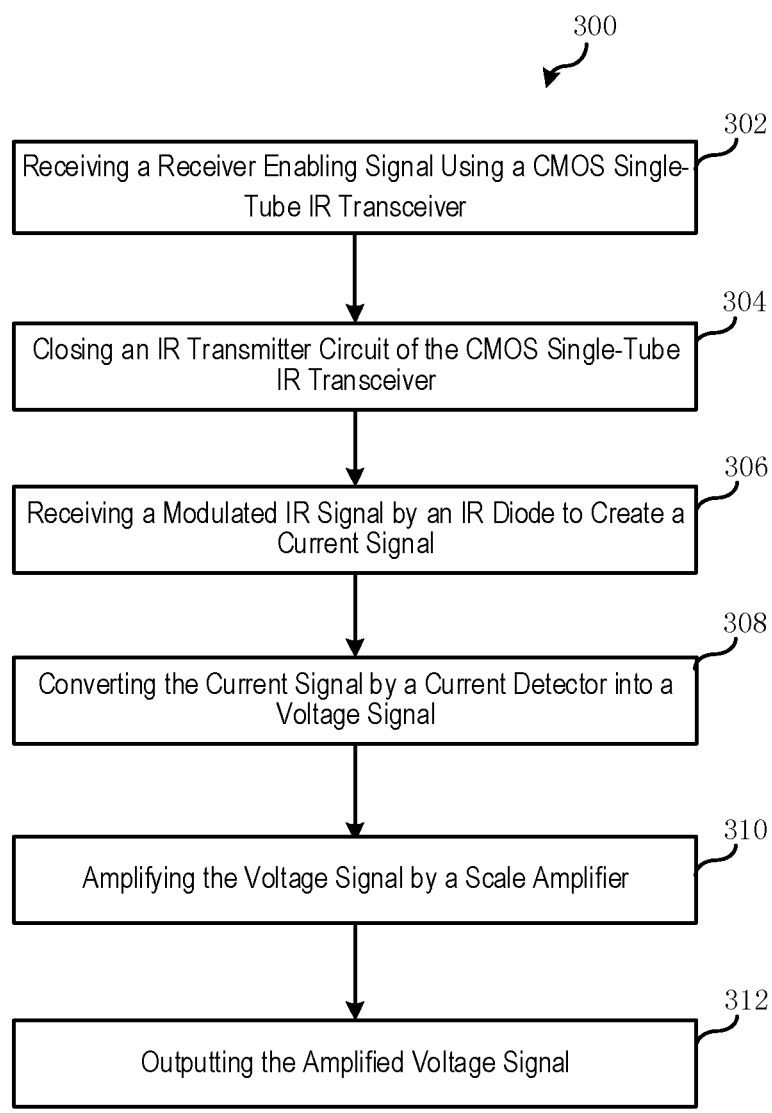
FIG. 3 is a flow chart illustrating a method of receiving a modulated IR signal using the CMOS single-tube IR transceiver according to an embodiment of the application.

FIG. 3 is a flow chart illustrating a method 300 of receiving a modulated IR signal using a CMOS single-tube IR transceiver 100 according to an embodiment. In an embodiment, in step 302, receiving a receiver enabling signal (TRSXW) using the CMOS single-tube IR transceiver 100 as shown in FIG. 1, in step 304, closing the IR transmitter circuit 100A of the CMOS single-tube IR transceiver 100, in step 306, receiving a modulated IR signal by the IR diode D1 to create a current signal, in step 308, converting the current signal by the current detector 50 into a voltage signal, in step 310, amplifying the voltage signal by the scale amplifier 60, and in step 312, outputting the amplified voltage signal to an MCU as discussed above.

In an embodiment, upon a gate of the receiver enabling PMOSFET switch (MPsw) 40 of the IR receiver circuit 100B receiving the receiver enabling signal (TRSXW) having a low-voltage level, the IR transmitter circuit 100A will be closed (or turned off).

In an embodiment, the amplified voltage signal from the scale amplifier 60 is shaped by a comparator 70. Then, the shaped voltage signal from the comparator 70 is output to the MCU. The MCU may demodulate the received modulated signal to obtain a demodulated signal.

Due to the structure and the use of CMOS components, the single-tube IR transceiver of the application can be manufactured using standard CMOS process. The integration degree of the single-tube IR transceiver can be highly increased, the PCB size can be greatly reduced, and thus the cost can be lowered.

Features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A CMOS infrared (IR) transceiver comprising:
    an IR transmitter circuit comprising:
        a PMOS current mirror having a first PMOSFET and a second PMOSFET,
        a NMOS current mirror having a first NMOSFET and a second NMOSFET,
        a PMOS switch, and
        a NMOS switch coupled in series with the PMOS switch,
        wherein the PMOS current mirror and the NMOS current mirror is coupled in series between a power supply and the PMOS switch, wherein the NMOS current mirror is coupled in series between the PMOS switch and the ground, and the NMOS switch is coupled in parallel with the first NMOSFET, and wherein the PMOS switch and the NMOS switch are configured to receive a Pulse Width Modulated (PWM) signal from a Micro Controller Unit (MCU);
    an IR receiver circuit; and
    an IR diode coupled to the IR transmitter circuit and the IR receiver circuit configured to emit an output IR signal or accept an input IR signal.

2. The CMOS IR transceiver of claim 1, wherein gates of the PMOS switch and the NMOS switch are coupled together and configured to receive the PWM signal from the MCU.

3. The CMOS IR transceiver of claim 1, wherein the IR diode is coupled in series between the power supply and the second NMOSFET of the NMOS current mirror.

4. The CMOS IR transceiver of claim 1, wherein an anode (+) of the IR diode is coupled to the power supply, and a cathode (−) of the IR diode is coupled to a drain of the second NMOSFET.

5. The CMOS IR transceiver of claim 1, wherein a drain of the first PMOSFET and gates of the first PMOSFET and the second PMOSFET are coupled together and configured to receive a reference current from the MCU.

6. The CMOS IR transceiver of claim 1, wherein a source of the PMOS switch is coupled to a drain of the second PMOSFET.

7. The CMOS IR transceiver of claim 1, wherein drains of the PMOS switch, the NMOS switch and the first nMOSFET are coupled to gates of the first nMOSFET and the second nMOSFET.

8. The CMOS IR transceiver of claim 1, wherein sources of the NMOS switch, the first NMOSFET and the second NMOSFET are coupled together to the ground.

9. The CMOS IR transceiver of claim 1, wherein the IR receiver circuit comprises a receiver enabling PMOSFET switch, a current detector, a scale amplifier, and a comparator coupled in series.

10. The CMOS IR transceiver of claim 9, wherein upon a gate of the receiver enabling PMOSFET switch receiving a receiver enabling signal of high-voltage level, the IR receiver circuit is shut down and the IR transmitter circuit is set ready to work.

11. The CMOS IR transceiver of claim 9, wherein upon a gate of the receiver enabling PMOSFET switch receiving a receiver enabling signal of low-voltage level and the PWM signal from the MCU being at low-voltage level, the IR transmitter circuit is shut down and the IR receiver circuit is set ready to work.

12. The CMOS IR transceiver of claim 9, wherein the current detector comprises a current detection resistor and a first amplifier coupled in parallel.

13. The CMOS IR transceiver of claim 9, wherein the scale amplifier comprises a first resistor and a second resistor coupled in series, and a second amplifier coupled in parallel with the second resistor.

14. The CMOS IR transceiver of claim 9, wherein the comparator is configured to receive an output voltage from the scale amplifier and to output a shaped voltage signal to the MCU.

15. A method of transmitting an infrared signal comprising:
receiving a receiver enabling signal using a CMOS single-tube IR transceiver, the CMOS single-tube IR transceiver including:
an IR transmitter circuit, the IR transmitter circuit comprising: a PMOS current mirror having a first PMOSFET and a second PMOSFET, a NMOS current mirror having a first NMOSFET and a second NMOSFET, a PMOS switch, and a NMOS switch, wherein the PMOS current mirror is coupled in series between a power supply and the PMOS switch, wherein the NMOS current mirror is coupled in series between the PMOS switch and the ground, wherein the NMOS switch is coupled in parallel with the first NMOSFET, and wherein the PMOS switch and the NMOS switch are configured to receive a Pulse Width Modulated signal from a Micro Controller Unit;
an IR receiver circuit comprising a receiver enabling PMOSFET switch; and
an IR diode coupled to the IR transmitter circuit and the IR receiver circuit and configured to emit or receive an IR signal;
closing the IR receiver circuit;
receiving the PWM signal using the IR transmitter circuit; and
emitting a modulated IR signal by the IR diode.

16. The method of claim 15, wherein upon a gate of the receiver enabling PMOSFET switch of the IR receiver circuit receiving the receiver enabling signal of a high-voltage level, the IR receiver circuit is closed.

17. A method of receiving an infrared signal comprising:
receiving a receiver enabling signal using a CMOS single-tube IR transceiver, the CMOS single-tube IR transceiver including:
an IR transmitter circuit configured to drive an emission of an IR signal;
an IR receiver circuit comprising a receiver enabling PMOSFET switch, a current detector, a scale amplifier, and a comparator coupled in series; and
an IR diode coupled to the IR transmitter circuit and the IR receiver circuit and configured to emit or receive an IR signal;
closing the IR transmitter circuit;
receiving a modulated IR signal by the IR diode to create a current signal;
converting the current signal by the current detector into a voltage signal;
amplifying the voltage signal by the scale amplifier; and
outputting the voltage signal to a Micro Controller Unit (MCU).

18. The method of claim 17, wherein upon a gate of the receiver enabling PMOSFET switch receiving the receiver enabling signal of a low-voltage level, the IR transmitter circuit is closed.

19. The method of claim 17, further comprising after amplifying the voltage signal by the scale amplifier, shaping the voltage signal by the comparator.

* * * * *